United States Patent
Olomskiy

(10) Patent No.: US 9,530,272 B2
(45) Date of Patent: Dec. 27, 2016

(54) SYSTEM AND METHOD FOR DISPLAYING MULTIPLE ACTIVITIES

(75) Inventor: Evgeny Olomskiy, Vladivostok (RU)

(73) Assignee: ZOTOBI MANAGEMENT LTD., Tortola (VG)

( * ) Notice: Subject to any disclaimer, the term of this patent is extended or adjusted under 35 U.S.C. 154(b) by 216 days.

(21) Appl. No.: 13/402,671

(22) Filed: Feb. 22, 2012

(65) Prior Publication Data

US 2013/0215043 A1    Aug. 22, 2013

(51) Int. Cl.
*G07F 17/32* (2006.01)
*G06F 3/0481* (2013.01)
*G09G 5/14* (2006.01)

(52) U.S. Cl.
CPC ............ *G07F 17/32* (2013.01); *G06F 3/0481* (2013.01); *G09G 5/14* (2013.01)

(58) Field of Classification Search
CPC ........ G06F 3/0481; G06F 9/4443; G09G 5/14; G07F 17/32; G07F 17/3244
USPC .................... 715/781, 767; 463/16
See application file for complete search history.

(56) References Cited

U.S. PATENT DOCUMENTS

| | | | |
|---|---|---|---|
| 5,305,435 A * | 4/1994 | Bronson | 715/777 |
| 5,848,058 A | 12/1998 | Ooyoshi | |
| 6,351,764 B1 | 2/2002 | Voticky | |
| 6,652,378 B2 | 11/2003 | Cannon et al. | 463/20 |
| 6,832,244 B1 | 12/2004 | Raghunandan | |
| 7,008,319 B2 | 3/2006 | Montgomery et al. | 463/21 |
| 7,266,186 B1 | 9/2007 | Henderson | |
| 7,438,642 B2 | 10/2008 | Walker et al. | 463/30 |
| 7,454,716 B2 | 11/2008 | Venolia | |
| 7,988,549 B2 | 8/2011 | Little | 463/20 |
| 8,402,374 B1 | 3/2013 | Rose | |
| 8,453,057 B2 * | 5/2013 | Stallings et al. | 715/726 |
| 2002/0038213 A1 | 3/2002 | Adachi | |
| 2002/0191029 A1 | 12/2002 | Gillespie | |
| 2003/0130849 A1 | 7/2003 | Durston | |
| 2003/0189597 A1 | 10/2003 | Anderson | |
| 2004/0015548 A1 | 1/2004 | Lee | |
| 2004/0021686 A1 | 2/2004 | Barberis | |
| 2005/0068167 A1 | 3/2005 | Boyer | |
| 2005/0114871 A1 | 5/2005 | Wolff | |
| 2005/0193345 A1 | 9/2005 | Klassen | |
| 2005/0233794 A1 | 10/2005 | Cannon et al. | 463/16 |
| 2006/0084450 A1 | 4/2006 | Dam Nielsen | |
| 2006/0117263 A1 * | 6/2006 | Locke | 715/751 |
| 2006/0121971 A1 * | 6/2006 | Slomiany et al. | 463/16 |
| 2006/0123353 A1 | 6/2006 | Matthews | |

(Continued)

*Primary Examiner* — Li Sun
(74) *Attorney, Agent, or Firm* — Pillsbury Winthrop Shaw Pittman LLP

(57) ABSTRACT

A virtual activity space is provided to users. The virtual activity space, or instances of the virtual activity space, may be used to enable users to participate in an activity such as, e.g., a card game. A user may participate in multiple activities concurrently. One of these activities, the so-called primary activity, is more dominantly and/or prominently presented than the other activities, the so-called secondary activities. Navigating between concurrent activities is accomplished through an interface that is displayed at the periphery of a view of a virtual activity space. A selection of a secondary activity simultaneously causes the primary activity to become a secondary activity, and causes the selected activity to become the new and current primary activity.

23 Claims, 6 Drawing Sheets

(56) References Cited

U.S. PATENT DOCUMENTS

| | | |
|---|---|---|
| 2009/0228791 A1 | 9/2009 | Kim |
| 2009/0293007 A1* | 11/2009 | Duarte et al. ................. 715/767 |
| 2010/0095240 A1 | 4/2010 | Shiplacoff |
| 2010/0107123 A1 | 4/2010 | Sareen |
| 2010/0306702 A1 | 12/2010 | Warner |
| 2011/0105224 A1* | 5/2011 | Hartmann et al. .............. 463/30 |

* cited by examiner

SYSTEM AND METHOD FOR DISPLAYING MULTIPLE ACTIVITIES

FIELD

The disclosure relates to systems and methods for enabling users to navigate between multiple concurrent activities. Navigation is accomplished through an interface that is displayed at the periphery of a view of a virtual activity space.

BACKGROUND

Virtual activity spaces that enable users to participate in games and/or other online (social) activities are known. In some of these virtual activity spaces, users can play separate games concurrently in separate instances of a virtual activity space. In some of these virtual activity spaces, users can play multiple separate games within a virtual activity space. Virtual activity spaces that enable users to play card games, or other turn-based games, are known. Online turn-based games in which a user/player has a limited amount of time to perform some action are known.

SUMMARY

One aspect of the disclosure relates to providing a virtual activity space to users. A virtual activity space may be used to enable users to participate in an activity, e.g. an online game. One aspect of the disclosure relates to systems, devices, and methods for users to navigate and/or switch between multiple concurrent activities within separate instances of a virtual activity space. By allowing a user to rapidly and efficiently move around and/or between multiple concurrent activities, the user may participate more easily and/or may participate in more activities concurrently.

In some implementations, a system configured to facilitate participation by an individual user in a plurality of virtual activity spaces may include a server and a client computing platform configured to communicate in a client/server fashion. The client computing platform may be associated with the individual user. View information of a virtual activity space may be transmitted and/or presented to users on client computing platforms. Users may be able to interact with the virtual activity space and/or participate in activities through inputs to the client computing platforms. Users may interact with and/or participate in multiple activities concurrently. The client computing platform may include a user interface that may have an electronic display, and may be configured to execute one or more of a primary view module, a secondary interface module, a view selection module, an activity input module, and/or other modules. Individual ones of the client computing platforms may be interchangeably referred to herein as computing devices. The user interface of an activity or game may be referred to as an activity window or game window, or, alternatively, a screen of desktop.

For a particular user, one or more of the currently active activities may be displayed on and/or presented through the user interface more dominantly and/or prominently than the other concurrent activities. In some implementations, more dominant or prominent may refer to the relative percentage of screen space allotted per activity and/or a more central position within the interface allotted for an activity. In this ordering of activities, the former may be referred to as primary activities, while the latter may be referred to as secondary activities. The respective virtual activity spaces may be referred to as primary activity spaces and secondary activity spaces. The respective user interfaces may be referred to as primary interfaces and secondary interfaces. The ordering of activities, virtual activity spaces, and/or user interfaces may alternatively be referred to as a hierarchy and/or differentiation of activities, virtual activity spaces, and/or user interfaces. For example, the electronic display and/or a touch screen may be a limited resource of the computing device. The combined full-blown and/or full-featured graphic user interface of all currently active activities may not fit on the available user interface hardware, e.g. on the electronic display, of the computing device. The one or more primary activities may be presented and/or used differently in comparison to the one or more secondary activities. Navigation between concurrent active activities, such as, e.g., causing a secondary activity to become a primary activity, and/or vice versa, may be accomplished using, among others, the following computer program modules of a client computing platform.

In some implementations, "activities" may refer to games, such as, by way of non-limiting example, online card and/or dice games. In some implementations, "activities" may refer to either games or other applications, such as, by way of non-limiting example, professional applications, multi-media applications, business applications, medical applications, and/or other non-game applications. In some implementations, "activities" may refer to non-game applications.

The primary view module on the client-side of the system may be configured to obtain view information defining views of primary activity spaces within which users are currently participating and/or otherwise actively engaged in primary activities. The view information defining a virtual activity space of a particular activity may more simply be referred to as the view information of the particular activity. The view information of an activity may include any information needed to present the activity to a user, or any subset of such information, to enable participating and/or interaction of the user with the activity. For a particular user, the primary view module may be configured to obtain view information defining a particular view of a particular primary activity. In some implementations, the primary view module may operate using multiple primary activities. The primary view module may be further configured to generate interfaces of the primary activity spaces based on the obtained view information for presentation to users via user interface hardware, e.g., for presentation on an electronic display.

The secondary interface module on the client-side of the system may be configured to obtain secondary activity information for secondary activities that the user is participating in and that are taking place in one or more secondary activities spaces concurrently with the primary activity. For example, for a particular user, the secondary interface module may be configured to obtain secondary activity information for one or more secondary activities that the particular user is participating in concurrently with the particular primary activity. The secondary interface module may be further configured to generate a secondary interface for display at, e.g., the periphery of the primary interface. In some implementations, the secondary interface includes one or more interface elements that indicate information about the corresponding one or more secondary activities conveyed by the obtained secondary activity information. For example, activity-specific activity information may include information related to which player/contributor is having a turn, how much time is left in the turn of a user, and/or other activity-specific and/or dynamic activity information. The secondary interface module may be configured to present the secondary interface to a user concurrently with the presentation of the primary interface.

The view selection module on the client-side of the system may be configured to receive selections by users, e.g. through the secondary interface that is generated by the secondary interface module. The received selections may indicate a secondary activity, which, upon receipt of the selection, becomes a primary activity. For example, for a particular user, the view selection module may be configured to receive a selection by the particular user, through one or both of the primary interface and/or the secondary interface, such that the selection indicates a particular secondary activity that is currently taking place in a particular secondary activity space. Responsive to receipt of the selection, the particular secondary activity may become the new and/or current primary activity, while, e.g. at the same time, an activity that was a primary activity prior to the selection, may become one of the one or more secondary activities.

In some implementations, responsive to receipt of the selection, the primary view module may be configured to obtain view information defining a view of the activity space that was previously a secondary activity space. The primary view module may be configured to generate the primary interface based on the view information defining the view of the activity space that was previously a secondary activity space. At or around the same time, the secondary interface module may be configured to obtain secondary activity information for the activity that was previously the primary activity. The secondary interface module may be configured to generate the secondary interface with an interface element that indicates information conveyed by the secondary activity information obtained for the activity that was previously the primary activity.

The activity input module on the client-side of the system may be configured to receive user inputs to interact with a primary activity. In some implementations, the activity input module may be further configured such that users may interact with one or more secondary activities. For example, in some implementations, a limited set of features and/or options, compared to the set of features and/or options for interaction with a primary activity, may be available to interact with a secondary activity.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
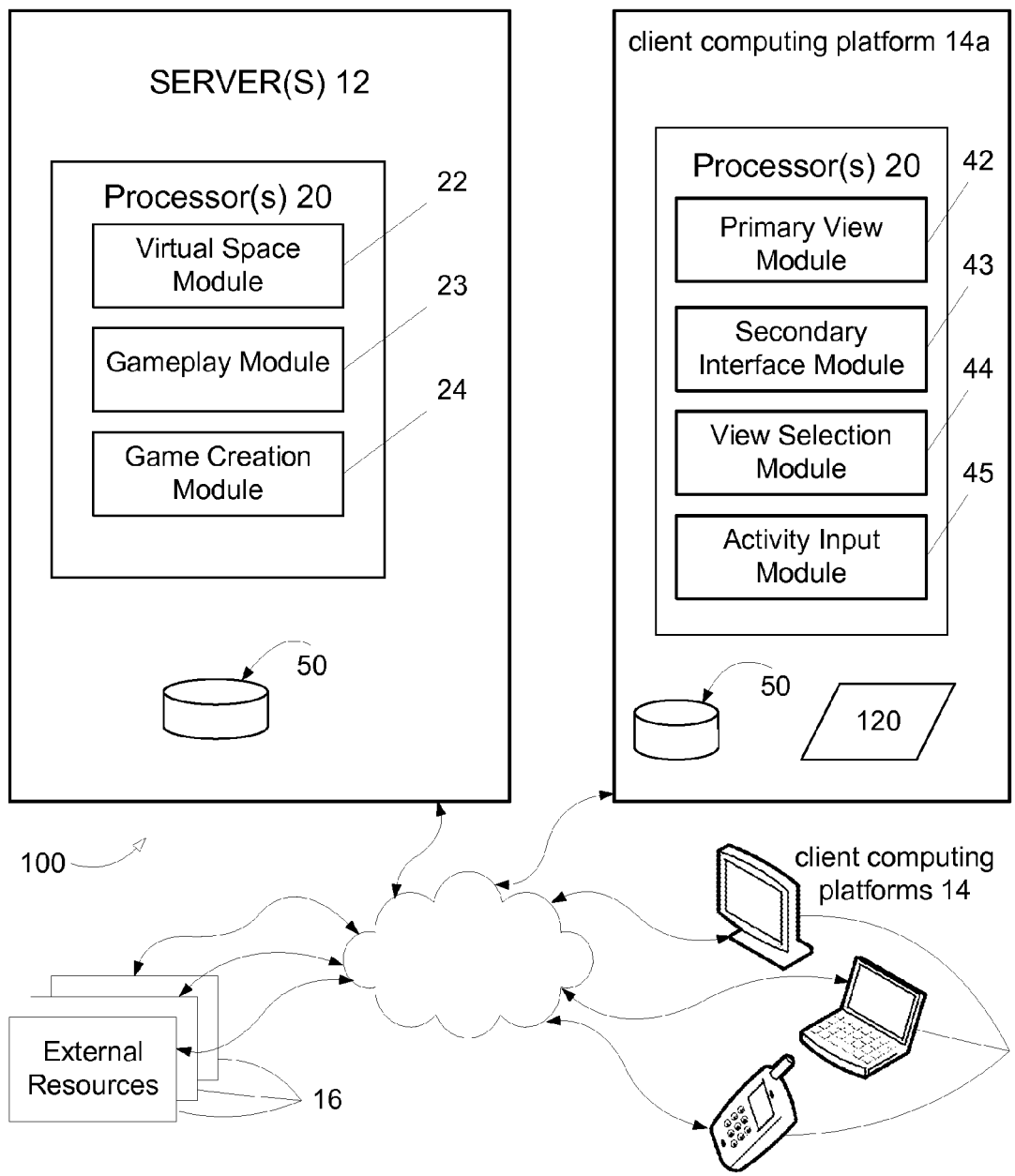
FIG. 1 illustrates a system configured for a user to navigate between concurrent activities within virtual activity spaces.

FIG. 1 illustrates a system 100 configured to provide a virtual activity space to users. The system 100 may be configured such that the users participate in one or more activities within the virtual activity space. In particular, the activity may for example be a virtual card game. A user interface provided to the users may facilitate a convenient and intuitive interface feature for navigating between multiple concurrently active activities. This may enhance game play for participating users via mobile devices, and/or on other client computing platforms. Providing the virtual activity space may include hosting the virtual activity space over a network.

In some implementations, system 100 may include one or more servers 12, hereinafter simply referred to as server 12. Server 12 may be configured to communicate with one or more client computing platforms 14 (hereinafter simply referred to as client computing platform 14 or client computing platforms 14) according to, e.g., a client/server architecture. The users may access system 100 and/or the virtual activity space via client computing platforms 14.

As depicted for exemplary client computing platform 14a in FIG. 1, client computing platform 14a may include one or more processors 20, a user interface 120, electronic memory 50, and/or other components. Client computing platform 14a may be configured to execute one or more of a primary view module 42, a secondary interface module 43, a view selection module 44, an activity input module 45, and/or other modules.

The computer program modules may be configured to enable or user associated with the given client computing platform 14 to interface with system 100, and/or provide other functionality attributed herein to client computing platforms 14. For example, the computer program modules may receive view information from server 12 and/or present a view of the virtual activity space based on the received view information. This may facilitate participation by the users of client computing platforms 14 in the activity taking place in the virtual activity space. By way of non-limiting example, client computing platform 14a may include one or more of a desktop computer, a laptop computer, a handheld computer, a tablet computing platform, a NetBook, a Smartphone, a gaming console, and/or other computing platforms.

Primary view module 42 on the client-side of system 100 in FIG. 1 may be configured to obtain view information defining views of primary activity spaces within which users are currently participating and/or otherwise actively engaged in activities. The view information defining a virtual activity space of a particular activity may more simply be referred to as the view information of the particular activity. The view information of an activity may include any information needed to present the activity to a user, or any subset of such information, to enable participation and/or interaction of the user with the activity. For a particular user, primary view module 42 may be configured to obtain view information defining a particular view of a particular activity. In some implementations, primary view module 42 may operate using multiple primary activities. Primary view module 42 may be further configured to generate a user interface of one or more primary activity spaces, based on the obtained view information, for presentation to a user via user interface 120. The generated user interface may be presented, e.g., on an electronic display on client computing platform 14*a*.

Secondary interface module 43 on the client-side of system 100 in FIG. 1 may be configured to obtain secondary activity information for secondary activities that the user is participating in and that are taking place, in one or more secondary activities spaces, concurrently with the primary activity. For example, for a particular user, secondary interface module 43 may be configured to obtain secondary activity information for one or more secondary activities that the particular user is participating in concurrently with a particular primary activity. Secondary interface module 43 may be further configured to generate a secondary interface for display at, e.g., the periphery of the primary interface, and/or elsewhere within the user interface. Activity information of an activity may include the view information of that activity, a subset thereof, and/or information that is not included in the view information. In some implementations, a secondary interface includes one or more interface elements that indicate information about the corresponding one or more secondary activities conveyed by the obtained secondary activity information. For example, activity-specific activity information may include information related to which player is having a turn, how much time is left in the turn of a user, and/or other activity-specific and/or dynamic activity information. Secondary interface module 43 may be configured to present the secondary interface to a user concurrently with the presentation of the primary interface, e.g. by sharing the same electronic display.

View selection module 44 on the client-side of system 100 in FIG. 1 may be configured to receive selections by users, e.g. through the secondary interface that is generated by secondary interface module 43 and/or through other components of user interface 120. The received selections may indicate and/or select a secondary activity, which, upon receipt of the selection, is to become a primary activity. For example, for a particular user, view selection module 44 may be configured to receive a selection by the particular user, through one or both of the primary interface and/or the secondary interface, such that the selection indicates a particular secondary activity that is currently taking place in a particular secondary activity space. Responsive to receipt of the selection, the particular secondary activity may become a new and/or current primary activity, while, e.g. at the same time, an activity that was a primary activity prior to the selection, may become one of the one or more secondary activities. In other words, users may navigate between activities through selections received by view selection module 44.

In some implementations, responsive to receipt of the selection, primary view module 42 may be configured to obtain view information defining a view of the activity space that was previously a secondary activity space. Primary view module 42 may be configured to generate the primary interface based on the view information defining the view of the activity space that was previously a secondary activity space. At or around the same time, secondary interface module 43 may be configured to obtain secondary activity information for the activity that was previously the primary activity. Secondary interface module 43 may be configured to generate a secondary interface with an interface element that indicates information conveyed by the secondary activity information obtained for the activity that was previously the primary activity.

Figure 2A:
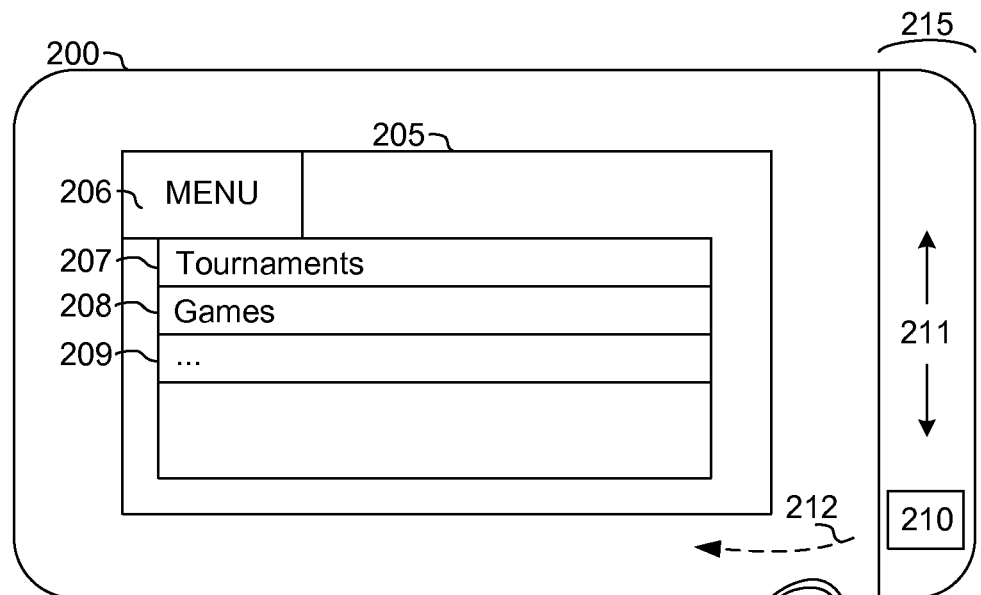
FIG. 2A-B illustrate views of an interface for a virtual activity space.
Figure 2B:
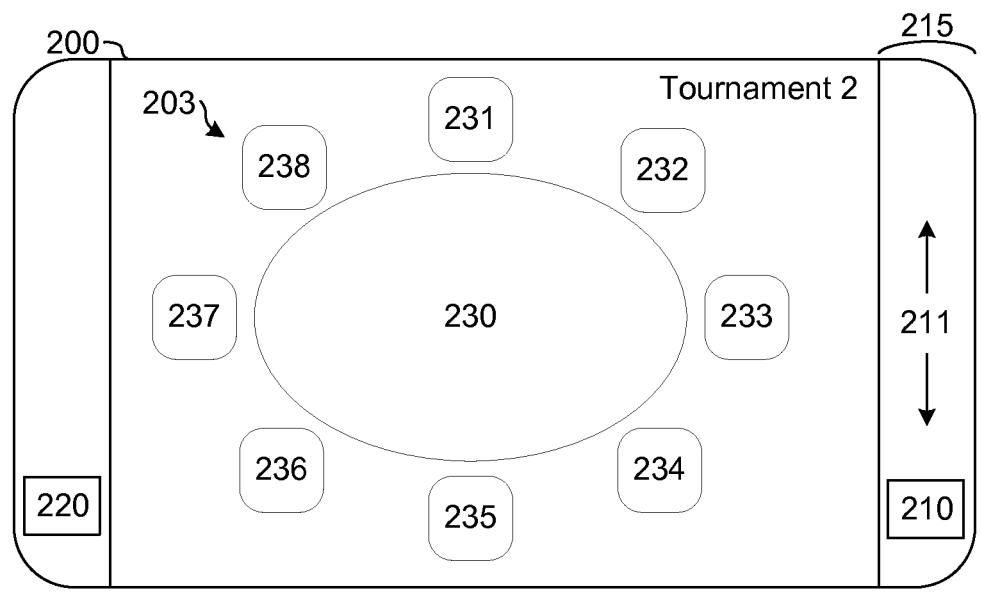

By way of illustration, FIGS. 2A-2B illustrate views of an interface 200 for a virtual activity space. In the examples of these figures, the multiple concurrent activities may be instances of virtual poker games taking place at one or more virtual poker tournaments. FIG. 2A illustrates an interface 200 that includes multiple interface elements, including menu element 205, menu indicator 206, menu options 207-209, activity indicator 210, status indicator 211, and/or other elements. In the mode or state depicted by FIG. 2A, menu element 205 comprises a window that presents information, including menu indicator 211 and/or menu options 207-209 to a user.

In implementations that use a touch screen, a user may touch and/or swipe on interface 200, e.g. with a finger 202, to interact. For example, a swiping motion in direction 212, may cause the activity or game indicated by activity indicator 210 to become the primary activity presented using interface 200, as depicted by FIG. 2B. The swiping motion triggering this change may originate at or near activity indicator 210. Referring to FIG. 2A, status indicator 211 may be associated with the activity or game indicated by activity indicator 210. For example, status indicator 211 may indicate status information about the secondary activity. Such status information may include one or more of whether it is the user's turn or not, a size of a current pot or bet, whether another user has entered a communication for the user and/or other users (e.g., via a chat function), and/or other status information. Responsive to it being the user's turn in the secondary activity, status indicator 211 may indicate how much time is left in the user's turn. In some implementations, status indicator 211 may include a timer, such as a bar that gradually changes one or more colors, shapes, or other graphical attributes, to indicate either the passage of time, the amount of time remaining in a particular turn, the amount of time remaining until for specific event and/or moment occurs, and/or any other static or dynamic activity-specific information. The arrows near status indicator 211 indicate that status indicator 211 may comprise the entire right-hand side column of interface 200, rather than just the location of the label "211". The combination of activity indicator 210 and status indicator 211, presented at the periphery of interface 200, may be considered a secondary interface 215, which may be generated by secondary interface module 43 (shown in FIG. 1).

Figure 3A:
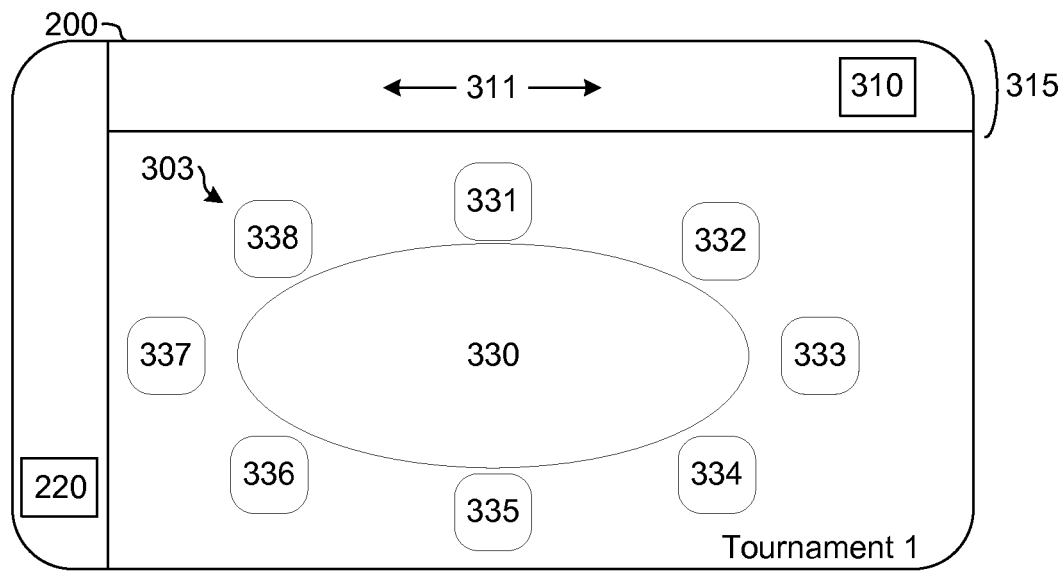
FIG. 3A-B illustrate views of an interface for a virtual activity space.

By way of illustration, FIG. 2B illustrates an interface 200 that includes multiple interface elements, including indicator 220, primary interface 203, virtual poker table 230, avatars 231-238, and/or other elements. In the mode or state depicted by FIG. 2B, primary interface 203 is presented to a user. Primary interface 203 may be generated by primary view module 42 (shown in FIG. 1). Referring to FIG. 2B, primary interface 203 may correspond to a primary activity labeled "Tournament 2". Avatars 231-238 may represent other players in this activity or game. A swiping motion in a direction corresponding to activity indicator 210 may cause the activity or game indicated by activity indicator 210, e.g. "Tournament 1", to become the primary activity presented using interface 200, as depicted in FIG. 3A. The swiping motion may originate at or near activity indicator 210. Referring to FIG. 2B, selection of indicator 220 may return interface 200 to the mode or state depicted in FIG. 2A.

By way of illustration, FIG. 3A illustrates an interface 200 that includes multiple interface elements, including activity indicator 310, status indicator 311, virtual poker table 330, avatars 331-338, and/or other elements. In the mode or state depicted by FIG. 3A, primary interface 303 is presented to a user. Primary interface 303 may be generated by primary view module 42 (shown in FIG. 1).

Figure 3B:
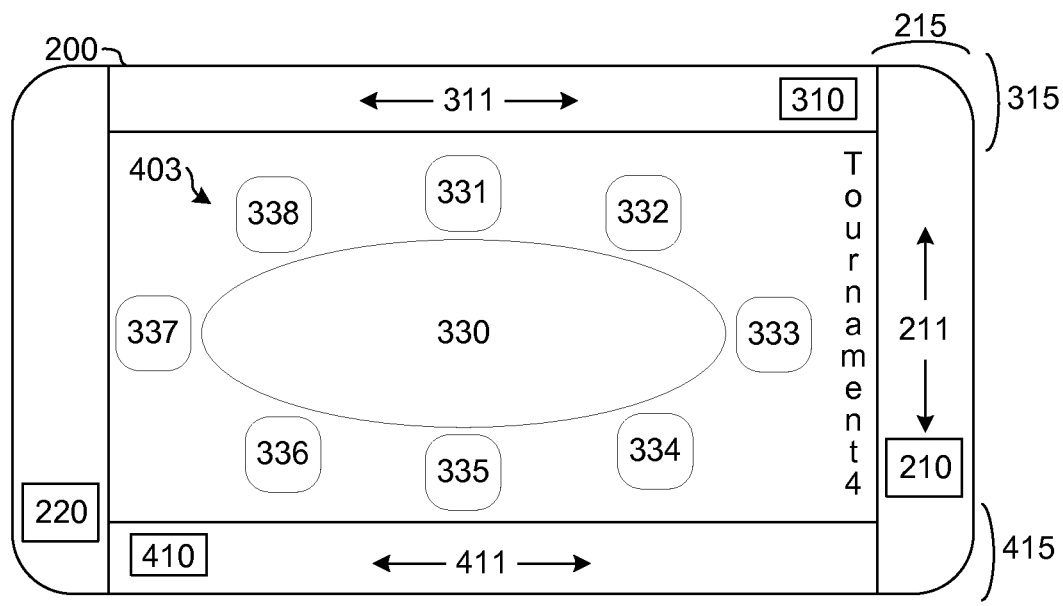

Referring to FIG. 3A, primary interface 303 may correspond to a primary activity labeled "Tournament 1". Avatars 331-338 may represent other players in the current primary activity. Status indicator 311 may indicate how much time is left in the user's turn within the activity or game associated with activity indicator 310. A swiping motion in a particular direction may cause the activity or game indicated by activity indicator 310, e.g. "Tournament 4", to become the primary activity presented using interface 200, as depicted in FIG. 3B. The swiping motion may originate at or near activity indicator 310. Referring to FIG. 3A, selection of indicator 220 may return interface 200 to the mode or state depicted in FIG. 2A. The combination of activity indicator 310 and status indicator 311, presented at the periphery of interface 200, may be considered a secondary interface 315, which may be generated by secondary interface module 43 (shown in FIG. 1).

By way of illustration, FIG. 3B illustrates an interface 200 that includes multiple interface elements, including activity indicators 210, 310 and 410, status indicators 211, 311 and 411, virtual poker table 330, avatars 331-338, and/or other elements. In the mode or state depicted by FIG. 3B, primary interface 403 is presented to a user. Primary interface 403 may be generated by primary view module 42 (shown in FIG. 1). Referring to FIG. 3B, primary interface 403 corresponds to an activity labeled "Tournament 4". Avatars 331-338 may represent other players in the current primary activity, and may include one or more of the same avatars and/or represented users as depicted in FIG. 3A.

Referring to FIG. 3B, status indicators 211, 311, and 411 may indicate how much time is left in the user's turn within the activities associated with activity indicators 210, 310, and 410, respectively. A swiping motion in a direction corresponding to activity indicator 310 may cause the activity indicated by activity indicator 310 to become the primary activity presented using interface 200. The swiping motion may originate at or near activity indicator 310. The combination of activity indicator 410 and status indicator 411, presented at the periphery of interface 200, may be considered a secondary interface 415, which may be generated by secondary interface module 43 (shown in FIG. 1). As depicted in FIG. 3B, interface 200 may comprises multiple secondary interfaces, corresponding to multiple secondary activities that the user is participating in concurrently with the primary activity of primary interface 403.

By using multiple swiping motions having different directions (and/or origination locations), a user may select one of multiple secondary interfaces to become a primary interface. In some implementations, multiple secondary interfaces may be arranged around the periphery of the primary interface so as to create a virtual line, circle, grid, and/or other arrangement, such that a user may scroll, by repeatedly swiping a finger on the touch screen, through the multiple secondary interfaces. In some implementations, the relative position of activities may be persistent, such that, e.g., a swiping motion to the right may navigate the user from "Tournament X" to "Tournament Y", while a subsequent swiping motion to the left may navigate the user back from "Tournament Y" to "Tournament X". In some implementations, a spatial arrangement or other graphical characteristic (such as color, shape, direction of an arrow, etc.) of an interface element of a secondary interface, such as e.g. a activity indicator, is indicative of the specific action that is required to select that activity. Selection of indicator 220 may return interface 200 to the mode or state depicted in FIG. 2A.

In some implementations, view selection module 44 may be configured to automatically and/or autonomously activate a selection of a secondary activity. For example, when the amount of time left in a user's turn falls below a predetermined threshold of time, the selection of such an activity may occur automatically, such that the activity becomes a primary activity.

Activity input module 45 on the client-side of system 100 in FIG. 1 may be configured to receive user inputs to interact with a primary activity. In some implementations, activity input module 45 may be further configured such that users may interact with one or more secondary activities. For example, in some implementations, a limited set of features and/or options to interact with a secondary activity may be available, compared to the set of features and/or options for interaction with a primary activity. For example, an option to pass in a virtual poker game may be available directly through a secondary interface, such that navigating to another activity may not be required to exercise that option.

Figure 4A:
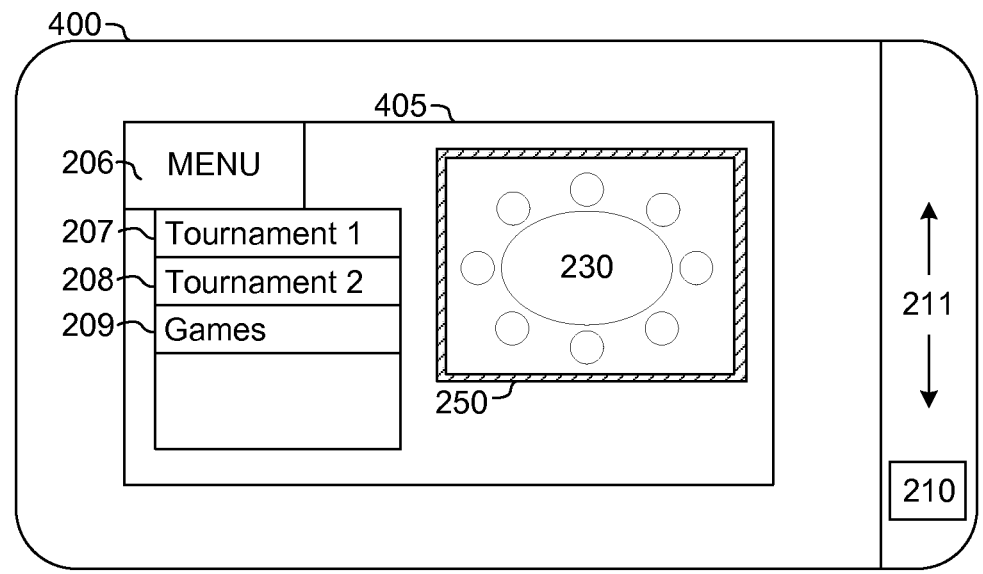
FIG. 4A-B illustrate views of an interface for a virtual activity space.
Figure 4B:
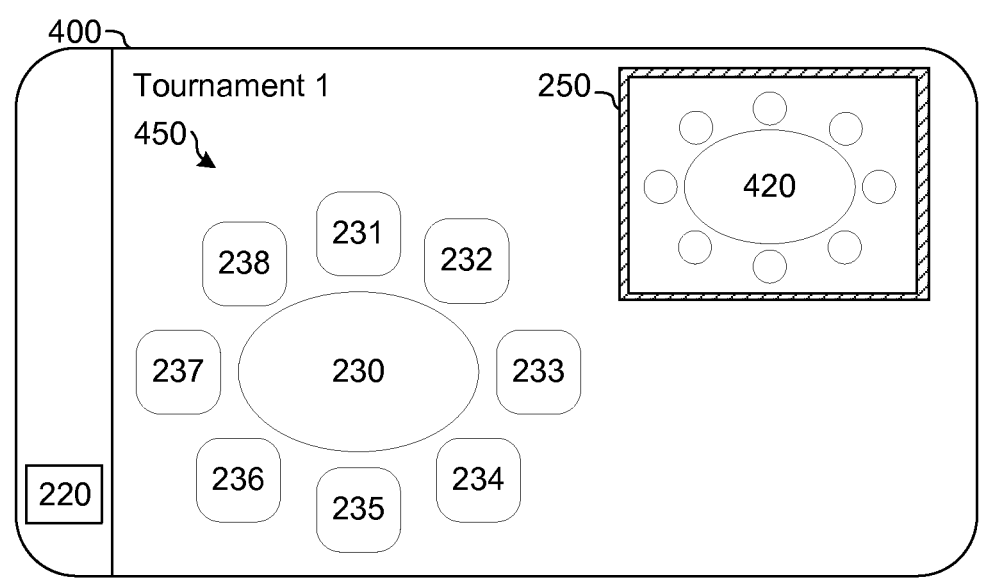

In some implementations, a secondary interface of an activity may be implemented differently that depicted in the examples of FIG. 2A-B and FIG. 3A-B. By way of illustration, FIG. 4A-B illustrate views of an interface 400 for a virtual activity space. In the examples of these figures, the multiple concurrent activities may be instances of virtual poker games taking place at one or more virtual poker tournaments. FIG. 4A illustrates an interface 400 that includes multiple interface elements, including menu element 405, menu indicator 206, menu options 207-209, activity indicator 210, status indicator 211, and/or other elements. In the mode or state depicted by FIG. 4A, menu element 405 comprises a window that presents information to a user, including menu indicator 211, menu options 207-209, and/or a preview interface 250, which may, e.g. comprise a virtual poker table 230. Preview interface 250 may be a secondary interface generated by secondary interface module 43 (shown in FIG. 1). Referring to FIG. 4A, the activity depicted within preview interface 250 may correspond to the selection by the user of, e.g., menu option 207 (labeled "Tournament 1") or menu option 208 (labeled "Tournament 2"). The periphery of preview interface 250 may serve a function similar to or substantially the same as status indicator 211 (as described in relation to FIG. 2A). Referring to FIG. 4A, the periphery of preview interface 250 may gradually change from green to red to indicate, e.g., the passage of time. A swiping motion in a direction corresponding to activity indicator 210 may cause the activity previewed by preview interface 250, e.g. "Tournament 1", to become the primary activity presented using interface 400, as depicted in FIG. 4B. The swiping motion may originate at or near activity indicator 210.

By way of illustration, FIG. 4B illustrates an interface 400 that includes multiple interface elements, including preview interface 250, primary interface 450, indicator 220, virtual poker table 230, avatars 231-238, and/or other elements. In the mode or state depicted by FIG. 4B, primary interface 450 is presented to a user. Primary interface 450 may be generated by primary view module 42 (shown in FIG. 1). Referring to FIG. 4B, primary interface 450 may correspond to a primary activity labeled "Tournament 1". Avatars 231-238 may represent other players in the current primary activity. Preview interface 250 may depict a virtual poker table 420. Preview interface 250 may be a secondary interface generated by secondary interface module 43 (shown in FIG. 1).

Referring to FIG. 4B, the activity depicted within preview interface 250 may correspond to a secondary activity, e.g. "Tournament 2". Selection or activation of the secondary activity depicted within preview interface 250 may cause that particular secondary activity to become the primary activity in interface 400, as e.g. depicted in FIG. 5. Selection of indicator 220 may return interface 400 to the mode or state depicted in FIG. 4A.

Figure 5:
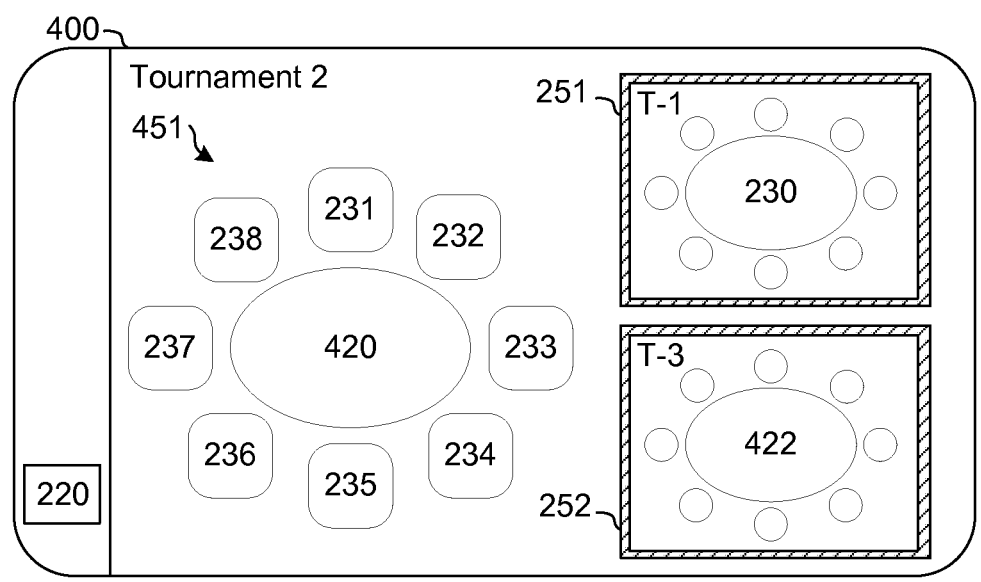
FIG. 5 illustrates a view of an interface for a virtual activity space.

By way of illustration, FIG. 5 illustrates an interface 400 that includes multiple interface elements, including preview interface 251, preview interface 252, primary interface 451, indicator 220, virtual poker table 420, avatars 231-238, and/or other elements. In the mode or state depicted by FIG. 5, primary interface 451 is presented to a user. Primary interface 451 may be generated by primary view module 42 (shown in FIG. 1). Referring to FIG. 5, primary interface 451 may correspond to a primary activity labeled "Tournament 2". Primary interface 451 may include virtual poker table 420. Avatars 231-238 may represent other players in the current primary activity. Preview interfaces 251 and 252 may depict virtual poker tables 230 and 422, respectively. Preview interfaces 251 and 252 may be secondary interfaces generated by secondary interface module 43 (shown in FIG. 1). Referring to FIG. 5, the activities depicted within preview interfaces 251 and 252 may correspond to secondary activities, e.g. "Tournament 1" and "Tournament 3", respectively. Selection or activation of the secondary activities depicted within preview interfaces 251 or 252 may cause the selected secondary activity to become the primary activity in interface 400. Selection of indicator 220 may return interface 400 to the mode or state depicted in FIG. 4A.

Referring back to FIG. 1, on the server-side of system 100, server 12 may include one or more processors 20, electronic memory 50, and/or other components. One or more processors may be configured to execute one or more computer program modules. The computer program modules may include one or more of a virtual space module 22, a gameplay module 23, a game creation module 24, and/or other modules.

Virtual space module 22 of server 12 in FIG. 1 may be configured to provide one or more virtual activity spaces to users via client computing platforms 14. As used herein, a "virtual activity space" may include a virtual space, one or more interactive, electronic social media, and/or other virtual environments. A virtual activity space may refer to a virtual environment in which a game is being played or an activity takes place that involves a plurality of users. Providing a virtual environment to users may include hosting, supporting, and/or executing one or more instances of a virtual environment, determining view information defining and/or representing the virtual environment (e.g., from one or more instances) for the users (e.g., individually and/or collectively), transmitting the view information to the client computing platforms 14 associated with the users to facilitate views of the virtual environment being presented to the users, and/or other activities.

In some implementations, in views of the virtual activity space, avatars may represent users as an activity is taking place, a game is played, other online activities are performed, and/or other applications are being used (collectively referred to herein as activities) by and/or among the users in the virtual activity space. In some implementations, the multiple activities are instances of the same activity being played with a different set of players. For example, a first activity may comprise a table at a virtual poker tournament with a particular set of players actively participating. A second activity, which may be played concurrently with the first activity, may comprise another table at a virtual poker tournament. The second table may have a different set of players actively participating. Gameplay in the first activity may be substantially unrelated to gameplay in the second activity. "Substantially unrelated" means that the activities progress independently, despite the possibility that one or more particular players are participating in both activities. In some implementations, the multiple concurrent activities may not be instances of the same activity.

A virtual activity space may comprise a simulated space that is accessible by users via clients (e.g., client computing platforms 14) that present the views of the virtual activity space to a user. The simulated space may have a simulated physical layout, express ongoing real-time interaction by one or more users, and/or be constrained by simulated physics that governs interactions between virtual objects in the simulated space. In some instances, the simulated physical layout may be a 2-dimensional layout. In other instances, the simulated physical layout may be a 3-dimensional layout.

Virtual space module 22 of server 12 in FIG. 1 may be configured to express the virtual activity space in a relatively limited manner. For example, views of the virtual activity space presented to the users may be selected from a limited set of graphics depicting an event in a given place within the virtual activity space. The views may include additional content (e.g., text, audio, pre-stored video content, movable icons, avatars, and/or other content) that describes particulars of the current state of the space, beyond the relatively generic graphics. For example, a view of the virtual activity space may depict a card table and/or a non-player character that are static (or change relatively little) visually in views of virtual activity space. Icons representing game components (e.g., game pieces, playing cards, dice, and/or other game components) may change and/or move within the views of the virtual activity space to depict a game being played within the virtual activity space. Such limited representation of the virtual activity space may reduce the cost of hosting the virtual activity space in terms of processing, storage, communication bandwidth, and/or other computing resource (e.g., on server 12 and/or client computing platforms 14). Other expressions of individual places within the virtual activity space are contemplated.

Within the instance(s) of the virtual activity space (or other virtual environment) executed by virtual space module 22, users may control avatars to interact with the virtual activity space and/or each other. As used herein, the term "user character" may refer to an object (or group of objects) present in the virtual activity space that represents an individual user. The avatar may be controlled by the user with which it is associated. The avatar representing a given user may be created and/or customized by the given user. The user may have an "inventory" of virtual goods and/or currency that the user can use (e.g., by manipulation of an avatar or other user controlled element, and/or other items), display, gift, and/or otherwise interact with within the virtual activity space.

The users may participate in the virtual activity space by controlling one or more of the available user controlled elements in the virtual activity space (e.g., game elements, avatars, and/or other elements). Control may be exercised through control inputs and/or commands input by the users through client computing platforms 14.

Gameplay module 23 of server 12 in FIG. 1 may be configured to manage the activity taking place or game being played by the users within the virtual activity space. Managing the activity may include one or more of determining score, assessing success and/or failure (e.g., of individual actions, sets, of actions, matches, game events within an individual match, and/or other episodes), determining random or pseudo-random game parameters (e.g., card value during ordering and/or distribution, dice values, battle multipliers, and/or other parameters), and/or other management functions. Managing the activity may include accepting input in the form of user selections and/or actions (e.g., input at client computing platforms 14), output from one or more random (or pseudo-random) number generators, rules and/or settings governing one or more game mechanics of the activity, and/or other inputs. Managing the activity may include determining outputs in the form scores (e.g., of individual actions, sets, of actions, matches, game events within an individual match, and/or other episodes), winners and/or losers, required actions to be performed by the users, and/or other outputs.

By way of non-limiting example, in some implementations, gameplay module 23 may be configured to manage a game of poker being played within the virtual activity space. Such management may require one or more of determining blind size and/or assignment, determining card value and/or distribution, managing the pot (e.g., obtaining wager amounts, distributing winnings, and/or other management), determining hand winners, maintaining user chip stacks, maintaining user bank rolls, and/or other management tasks. As another non-limiting example, gameplay module 23 may be configured to manage a game of backgammon. Such management may require one or more of managing checker position, determining dice value, determining doubling cube value, determining score, determining a winner, and/or other management tasks. Implementations in which gameplay module 23 manages other turn-based activities or games are contemplated. Such activities or games may be based on real world board, dice, and/or card games, and/or games that have not previously been implemented as real world games. Note that such activities may be based on applications that are not games.

It will be appreciated that the description herein of virtual space module 22 providing a virtual activity space to a set of users in which an activity is being used by the set of users is not intended to be limiting. For example, virtual space module 22 may be configured to provide a plurality of different virtual activity spaces to a plurality of different sets of users. The individual sets of users may be participating in different instances of the activity within the individual virtual activity spaces. The concepts described herein with respect to the individual virtual activity space and activity should be extendible to implementations in which a plurality of different virtual activity spaces are being used to conduct a plurality of different instances of the activity (e.g., between different sets of users).

Game creation module 24 of server 12 in FIG. 1 may be configured to create, initialize, and/or start new activities or games for a user. Alternatively, and/or simultaneously, game creation module 24 may be configured to determine a suitable activity or game in progress that a user can join. For example, an active virtual poker tournament and/or a particular virtual table at such a tournament, having one or more currently active users/players, may have availability for another user to join a game in progress.

It will be appreciated that the described functionality on the server-side of system 100 is not limited to the organization and/or structure of specific computer program modules. This functionality may be enabled and/or performed through fewer or more computer program modules. Specific features herein attributed to a particular computer program module may be integrated and/or combined within the functionality of one or more other computer program modules. For example, the described functionality of gameplay module 23 and game creation module 24 may, in some implementations, be embedded within virtual space module 22.

It should be noted that the described functionality on the client-side and the server-side of system 100 does not limit the implementation of similar systems in which the various functions are organized or structured differently, but which offers similar navigation between multiple concurrent activities. For example, the described functionality of view selection module 44 and/or activity input module 45 may, in some implementations, be embedded within primary view module 42 and/or secondary interface module 43.

Turning back to FIG. 1, in some implementations, 12 server and client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14 may be connected and/or interface via some other configuration and/or mechanism.

A given client computing platform 14 may include one or more processors, and electronic display, a control interface, and/or other components. The one or more processors may be configured to execute computer program modules.

Server 12 may include electronic storage 50, one or more processors 20, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented "in the cloud" by a plurality of computing platforms operating together as server 12.

Client computing platform 14 may include electronic storage 50. This component does not need to be the same as electronic storage 50 within server 12, though both may share functionality. Client computing platform 14 may include one or more processors 20. This component does not need to be the same as processor 20 within server, though both may share functionality.

Electronic storage 50 may comprise electronic storage media that electronically stores information. The electronic storage media of electronic storage 50 may include one or both of system storage that is provided integrally (i.e., substantially non-removable) with server 12 or client computing platform 14 and/or removable storage that is removably connectable to server 12 or client computing platform 14 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 50 may include one or more virtual storage resources (e.g., cloud storage, a virtual private network, and/or other virtual storage resources). Electronic storage 50 may store software algorithms, information determined by processor 20, information received from server 12, information received from client computing platforms 14, and/or other information that enables server 12 or client computing platform 14 to function as described herein.

Processor(s) 20 is configured to provide information processing capabilities in server 12 or client computing platform 14. As such, processor 20 may include one or more of a digital processor, an analog processor, a digital circuit designed to process information, an analog circuit designed to process information, a state machine, and/or other mechanisms for electronically processing information. Although processor 20 may be shown in FIG. 1 as a single entity for server 12 or client computing platform 14, this is for illustrative purposes only. In some implementations, processor 20 may include a plurality of processing units. These processing units may be physically located within the same device, or processor 20 may represent processing functionality of a plurality of devices operating in coordination. The processor 20 may be configured to execute modules 22, 23, and/or 24, or alternatively, modules 42, 43, 44, and/or 45. Processor 20 may be configured to execute modules by software; hardware; firmware; some combination of software, hardware, and/or firmware; and/or other mechanisms for configuring processing capabilities on processor 20.

It should be appreciated that although modules 22, 23, and 24 are illustrated in FIG. 1 as being co-located within a single processing unit, in implementations in which processor 20 includes multiple processing units, one or more of modules 22, 23, and/or 24 may be located remotely from the other modules. The same holds for modules 42, 43, 44, and 45. As a non-limiting example, some or all of the functionality attributed to modules 22, 23, and/or 24 may be provided "in the cloud" by a plurality of processors connected through a network. The description of the functionality provided by the different modules 22, 23, 24, 42, 43, 44, and/or 45 herein is for illustrative purposes, and is not intended to be limiting, as any of modules 22, 23, 24, 42, 43, 44, and/or 45 may provide more or less functionality than is described. For example, one or more of modules 22, 23, 24, 42, 43, 44, and/or 45 may be eliminated, and some or all of its functionality may be provided by other ones of modules 22, 23, 24, 42, 43, 44, and/or 45. As another example, processor 20 may be configured to execute one or more additional modules that may perform some or all of the functionality attributed below to one of modules 22, 23, 24, 42, 43, 44, and/or 45.

User interface 120 of client computing platform 14a in FIG. 1 is configured to provide an interface between client computing platform 14a and a user through which the user can provide information to and receive information from client computing platform 14a. This enables data, results, and/or instructions and any other communicable items, collectively referred to as "information," to be communicated between the user and client computing platform 14a. Examples of interface devices suitable for inclusion in user interface 120 include a keypad, buttons, switches, a keyboard, knobs, levers, a display screen, a touch screen, speakers, a microphone, an indicator light, an audible alarm, and a printer. Information may be provided to a user by user interface 120 in the form of auditory signals, visual signals, tactile signals, and/or other sensory signals.

It is to be understood that other communication techniques, either hard-wired or wireless, are also contemplated herein as user interface 120. For example, in one embodiment, user interface 120 may be integrated with a removable storage interface provided by electronic storage 50. In this example, information is loaded into client computing platform 14a from removable storage (e.g., a smart card, a flash drive, a removable disk, etc.) that enables the user(s) to customize the implementation of client computing platform 14a. Other exemplary input devices and techniques adapted for use with client computing platform 14a as user interface 120 include, but are not limited to, an RS-232 port, RF link, an IR link, modem (telephone, cable, Ethernet, internet or other). In short, any technique for communicating information with client computing platform 14a is contemplated as user interface 120.

Figure 6:
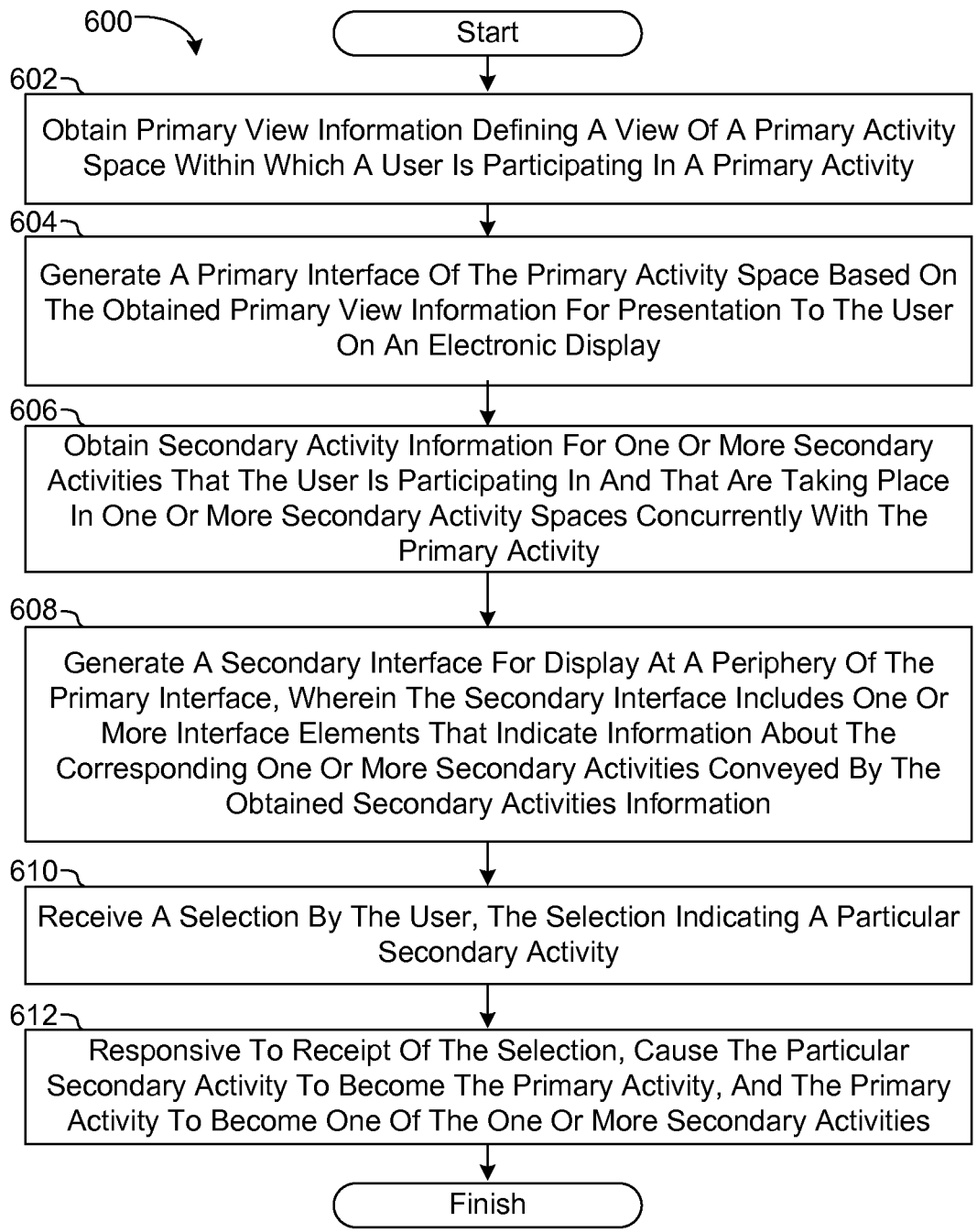
FIG. 6 illustrates a method for navigating between concurrent activities.

FIG. 6 illustrates a method 600 for navigating between concurrent activities within separate instances of a virtual activity space. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

In some embodiments, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, primary view information representing a view of a primary activity space is obtained. A user may be participating in a primary activity within the primary activity space. In some implementations, operation 602 may be performed by a primary view module similar to or the same as primary view module 42 (shown in FIG. 1 and described herein).

At an operation 604, a primary interface of the primary activity space is generated for presentation to the user on an electronic display. The primary interface may be based the obtained primary view information. In some implementations, operation 604 may be performed by a primary view module similar to or the same as primary view module 42 (shown in FIG. 1 and described herein).

At an operation 606, secondary activity information for one or more secondary activities that the user is participating in and that are taking place in one or more secondary activity spaces concurrently with the primary activity is obtained. In some implementations, operation 606 may be performed by a primary view module similar to or the same as primary view module 42 (shown in FIG. 1 and described herein).

At an operation 608, a secondary interface is generated for display at a periphery of the primary interface. The secondary interface includes one or more interface elements that indicate information about the corresponding one or more secondary activities conveyed by the obtained secondary activity information. In some implementations, operation 608 may be performed by a secondary interface module similar to or the same as secondary interface module 43 (shown in FIG. 1 and described herein).

At an operation 610, a selection by the user is received, e.g. through the secondary interface. The selection indicates a particular secondary activity. In some implementations, operation 610 may be performed by a view selection module similar to or the same as view selection module 43 (shown in FIG. 1 and described herein).

At an operation 612, responsive to receipt of the selection, the particular secondary activity becomes the primary activity, and the primary activity becomes one of the one or more secondary activities. In some implementations, operation 612 may be performed by a primary view module and a secondary interface module similar to or the same as primary view module 42 and secondary interface module 43 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computing device configured for a user to navigate between concurrent activities within separate virtual activity spaces, the device comprising:
    a user interface that includes an electronic display; and
    one or more hardware processors configured by machine-readable instructions to:
        obtain primary view information defining a primary view of a first activity space within which the user is participating in a first activity and to obtain primary view information defining a primary view of a second activity space within which the user is participating in a second activity concurrently with the first activity;
        generate a primary interface of the first activity space based on the obtained primary view information of the first activity space for presentation to the user on the electronic display, wherein the first activity includes a first game and the primary interface of the first activity space includes game play objects with which the first game is played and wherein the second activity includes a second game and the primary interface of the second activity space includes game play objects with which the second game is played;
        obtain secondary view information defining a view of the second activity space;
        generate a secondary interface of the second activity space based on the obtained secondary view information for display at a periphery of the primary interface, wherein the secondary interface of the second activity space includes one or more secondary interface elements, the secondary interface including a status indicator configured to display a status of an event occurring in the second activity conveyed by the obtained secondary view information for the second activity space and one or more preview interfaces distinct from the status indicator that is configured to display a preview of the primary view information defining the primary view of the second activity space;
        receive a selection, by the user, of the second activity, wherein the selection of the second activity by the user includes a swiping motion on a touch screen originated at or near the secondary interface for the second activity in a direction that corresponds to the position of the secondary interface for the second activity; and
        responsive to receipt of the selection of the second activity, generate a primary interface of the second activity space based on the obtained primary view information of the second activity space displayed on the one or more preview interfaces of the secondary interface for presentation to the user on the electronic display, and generate a secondary interface of the first activity space based on the obtained secondary view information of the first activity space, for display at a periphery of the primary interface of the second activity space;
        wherein the secondary interface for the first activity space conveys less information about the status of an event occurring in the first activity to the user than the primary interface for the first activity space such that the information conveyed by the secondary interface for the first activity includes information about the status of a turn in the first game, and the secondary interface for the second activity space conveys less information about the status of an event occurring in the second activity to the user than the primary interface for the second activity space, such that the information conveyed by the secondary interface for the second activity includes information about the status of a turn in the second game; and
        wherein, responsive to the user participating concurrently in more than two activities within separate virtual activity spaces, multiple secondary interfaces are displayed around the periphery of a primary interface to create one or more of a virtual line, circle, or grid such that the user scrolls through the multiple secondary interfaces to be selected and displayed as a primary interface one at a time by repeatedly swiping in different directions or from different origination locations on the touch screen.

2. The device of claim 1, wherein the secondary interface of the first activity space includes one or more secondary interface elements that indicate information about the first activity conveyed by the obtained secondary view information for the first activity space.

3. The device of claim 1, wherein the one or more hardware processors are further configured by machine-readable instructions to receive user input to interact with one or more of the first activity or the second activity.

4. The device of claim 1, wherein a spatial arrangement of the multiple secondary interfaces is indicative of an action required to accomplish the selection, and wherein the selection by the user is accomplished through the action that is specific to the second activity.

5. The device of claim 1, wherein the first activity and the second activity that the user is participating in include turn-based games, wherein the information about the status of the turn of the first game conveys how much time is left in the turn of the first game and the information about the status of the turn of the second game conveys how much time is left in the turn of the second game.

6. The device of claim 1, wherein in response to receipt of the selection of the second activity by the one or more hardware processors, the one or more hardware processors are further configured by machine-readable instructions to (i) obtain secondary view information defining a view of a third activity space within which the user is participating in a third activity concurrently with the first activity and the second activity, and (ii) generate a secondary interface of the third activity space based on the obtained secondary view information of the third activity space for presentation to the user on the electronic display at the periphery of the primary interface.

7. The device of claim 1, wherein the information conveyed by one or both of the secondary interface for the first activity and/or the secondary interface for the second activity includes a size of a current pot and/or bet.

8. The device of claim 1, wherein the primary interface for the first activity includes a table and the information conveyed by the secondary interface for the first activity lacks a table.

9. The device of claim 1, wherein the primary interface for the first activity includes one or more avatars and the information conveyed by the secondary interface for the first activity lacks the one or more avatars.

10. The device of claim 1, wherein the one or more preview interfaces comprise:
   a first preview interface configured to display a preview of a first primary view information defining a first primary view of a first secondary activity space; and
   a second preview interface distinct from the first preview interface and configured to display a preview of a second primary view information defining a second primary view of a second secondary activity space.

11. The device of claim 10, wherein responsive to receipt of a selection of the first secondary activity or the second secondary activity by the one or more hardware processors, the one or more hardware processors generate a primary interface of the first secondary activity or the second secondary activity, respectively.

12. A computer-implemented method for navigating between concurrent activities within separate instances of a virtual activity space, the method being implemented via a computing device comprising a user interface that includes an electronic display and one or more hardware processors configured by machine-readable instructions, the method comprising:
   obtaining primary view information defining a view of a first activity space within which the user is participating in a first activity;
   obtaining primary view information defining a view of a second activity space within which the user is participating in a second activity concurrently with the first activity;
   generating a primary interface of the first activity space based on the obtained primary view information of the first activity space for presentation to the user on an electronic display, wherein the first activity includes a first game and the primary interface of the first activity space includes game play objects with which the first game is played;
   obtaining secondary view information defining a secondary view of the second activity space;
   obtaining secondary view information defining a secondary view of the first activity space;
   generating a secondary interface of the second activity space based on the obtained secondary view information for the second activity space for display at a periphery of the primary interface, wherein the secondary interface of the second activity space includes one or more secondary interface elements, the secondary interface including a status indicator configured to display a status of an event occurring in the second activity conveyed by the obtained secondary view information for the second activity space and one or more preview interfaces distinct from the status indicator that is configured to display a preview of the primary view information defining the primary view of the second activity space;
   receiving a selection, by the user, of the second activity, wherein the selection of the second activity by the user includes a swiping motion on a touch screen originated at or near the secondary interface for the second activity in a direction that corresponds to the position of the secondary interface for the second activity; and
   responsive to receipt of the selection of the second activity:
      (1) generating a primary interface of the second activity space based on the obtained primary view information of the second activity space displayed on the one or more preview interfaces of the secondary interface for presentation to the user on the electronic display, wherein the second activity includes a second game and the primary interface of the second activity space includes game play objects with which the second game is played; and
      (2) generating a secondary interface of the first activity space based on the obtained secondary view information of the first activity space, for display at a periphery of the primary interface of the second activity space;
   wherein the secondary interface for the first activity conveys less information about the status of an event occurring in the first activity to the user than the primary interface for the first activity space such that the information conveyed by the secondary interface for the first activity includes information about the status of a turn in the first game, and the secondary interface for the second activity space conveys less information about the status of an event occurring in the second activity to the user to the user than the primary interface for the second activity space, such that the information conveyed by the secondary interface for the second activity includes information about the status of a turn in the second game; and
   wherein, responsive to the user participating concurrently in more than two activities within separate instances of the virtual activity space, multiple secondary interfaces are displayed around the periphery of a primary interface to create one or more of a virtual line, circle, or grid such that the user scrolls through the multiple secondary interfaces to be selected and displayed as a primary interface one at a time by repeatedly swiping in different directions or from different origination locations on the touch screen.

13. The computer-implemented method of claim 12, wherein the secondary interface of the first activity space includes one or more secondary interface elements that indicate information about the first conveyed by the obtained secondary view information for the first activity space.

14. The computer-implemented method of claim 12, further comprising:
   receiving user input to interact with one or more of the first activity or the second activity.

15. The computer-implemented method of claim 12, wherein receiving the selection by the user is accomplished through an action that is specific to the second activity, wherein a spatial arrangement of the multiple secondary interfaces is indicative of the specific action required to accomplish the selection.

16. The computer-implemented method of claim 12, wherein the first activity and the second activity that the user is participating in include turn-based games, wherein the information about the status of the turn of the first game conveys how much time is left in the turn of the first game and the information about the status of the turn of the second game conveys how much time is left in the turn of the second game.

17. The computer-implemented method of claim 12, wherein responsive to receipt of the selection:
obtaining secondary view information defining a view of a third activity space within which the user is participating in a third activity concurrently with the first activity and the second activity; and
generating a secondary interface of the third activity space based on the obtained secondary view information of the third activity space for presentation to the user on the electronic display at the periphery of the primary interface.

18. The computer implemented method of claim 12, wherein the information conveyed by one or both of the secondary interface for the first activity and/or the secondary interface for the second activity includes a size of a current pot and/or bet.

19. The computer implemented method of claim 12, wherein the primary interface for the first activity includes a table and the information conveyed by the secondary interface for the first activity lacks a table.

20. The computer implemented method of claim 12, wherein the primary interface for the first activity includes one or more avatars and the information conveyed by the secondary interface for the first activity lacks the one or more avatars.

21. A non-transient computer readable storage medium having stored thereon machine-readable instructions embodied thereon, the machine-readable instructions being executable to cause one or more hardware processors to perform a method for navigating between concurrent activities within separate instances of a virtual activity space, the method comprising:
obtaining primary view information defining a view of a first activity space within which the user is participating in a first activity;
obtaining primary view information defining a view of a second activity space within which the user is participating in a second activity concurrently with the first activity;
generating a primary interface of the first activity space based on the obtained primary view information of the first activity space for presentation to the user on an electronic display, wherein the first activity includes a first game and the primary interface of the first activity space includes game play objects with which the first game is played;
obtaining secondary view information defining a secondary view of the second activity space;
obtaining secondary view information defining a secondary view of the first activity space;
generating a secondary interface of the second activity space based on the obtained secondary view information for the second activity space for display at a periphery of the primary interface, wherein the secondary interface of the second activity space includes one or more secondary interface elements, the secondary interface including a status indicator configured to display a status of an event occurring in the activity conveyed by the obtained secondary view information for the second activity space and one or more preview interfaces distinct from the status indicator that is configured to display a preview of the primary view information defining the primary view of the second activity space;
receiving a selection, by the user, of the second activity, wherein the selection of the second activity by the user includes a swiping motion on a touch screen originated at or near the secondary interface for the second activity in a direction that corresponds to the position of the secondary interface for the second activity; and
responsive to receipt of the selection of the second activity:
(1) generating a primary interface of the second activity space based on the obtained primary view information of the second activity space displayed on the one or more preview interfaces of the secondary interface for presentation to the user on the electronic display, wherein the second activity includes a second game and the primary interface of the second activity space includes game play objects with which the second game is played; and
(2) generating a secondary interface of the first activity space based on the obtained secondary view information of the first activity space, for display at a periphery of the primary interface of the second activity space;
wherein the secondary interface for the first activity conveys less information about the status of an event occurring in the first activity to the user than the primary interface for the first activity space such that the information conveyed by the secondary interface for the first activity includes information about the status of a turn in the first game, and the secondary interface for the second activity space conveys less information about the status of an event occurring in the second activity to the user than the primary interface for the second activity space, such that the information conveyed by the secondary interface for the second activity includes information about the status of a turn in the second game; and
wherein, responsive to the user participating concurrently in more than two activities within separate instances of the virtual activity space, multiple secondary interfaces are displayed around the periphery of a primary interface to create one or more of a virtual line, circle, or grid such that the user scrolls through the multiple secondary interfaces to be selected and displayed as a primary interface one at a time by repeatedly swiping in different directions or from different origination locations on the touch screen.

22. The non-transient computer readable storage medium of claim 21, wherein the first activity and the second activity that the user is participating in include turn-based games, wherein the information about the status of the turn of the first game conveys how much time is left in the turn of the first game and the information about the status of the turn of the second game conveys how much time is left in the turn of the second game.

23. The non-transient computer readable storage medium of claim 21, wherein the method further comprises, responsive to receipt of the selection:
obtaining secondary view information defining a view of a third activity space within which the user is participating in a third activity concurrently with the first activity and the second activity; and
generating a secondary interface of the third activity space based on the obtained secondary view information of the third activity space for presentation to the user on the electronic display at the periphery of the primary interface.

* * * * *